United States Patent
Kawasaki

[19]

[11] Patent Number: 5,126,894
[45] Date of Patent: Jun. 30, 1992

[54] SERVO CIRCUIT FOR CAPSTAN MOTOR
[75] Inventor: Takao Kawasaki, Gunma, Japan
[73] Assignee: Victor Company of Japan, Ltd., Yokohama, Japan
[21] Appl. No.: 546,942
[22] Filed: Jul. 2, 1990
[30] Foreign Application Priority Data
Jun. 30, 1989 [JP] Japan .................................. 1-78029[U]
[51] Int. Cl.⁵ ..................... G11B 15/46; G11B 15/467
[52] U.S. Cl. .................................... 360/73.11; 360/13; 360/77.13
[58] Field of Search ................................. 360/13–14.3, 360/70, 73.04, 73.09–73.14, 77.12–77.17; 358/311, 321, 338, 339

[56] References Cited
U.S. PATENT DOCUMENTS
4,899,233 2/1990 Yoshida ........................ 360/77.14

Primary Examiner—Aristotelis Psitos
Assistant Examiner—Steven R. Garland
Attorney, Agent, or Firm—Fleit, Jacobson, Cohn, Price, Holman & Stern

[57] ABSTRACT

A servo circuit for a capstan motor has an element for recording a position detecting signal on a medium transported by the capstan motor, a magnetic head for reproducing the position detecting signal, a position detecting circuit for detecting a position error signal, a pulse generator for a pulse signal, a velocity detecting circuit for a velocity error signal, a phase comparator for comparing the phase of a clock signal and pulse signal and for outputting a phase error signal, a switch for selectively outputting the position error signal or the phase error signal, and a velocity control element for controlling the capstan motor by a velocity control signal. The servo circuit comprises a signal holding element connected in series to a signal supply path from the position detecting circuit to the velocity control element via the switch; a comparator circuit for outputting a detection signal when the phase error signal is within a predetermined level range; a holding control element responsive to the detection signal for controlling the signal holding element in a manner that in the case where the servo circuit is transited to a recording mode, until a transporting speed of the medium sufficiently reaches a predetermined speed, the signal holding element is caused to be in a passing state and then to enter a holding state, and when the signal holding element is caused to return to the passing state.

3 Claims, 8 Drawing Sheets

SERVO CIRCUIT FOR CAPSTAN MOTOR

BACKGROUND OF THE INVENTION

The present invention relates to a servo circuit for a capstan motor used in an apparatus for recording/reproducing digital data or the like, and more particularly to a servo circuit capable of obtaining a perfect continuation of recorded data at a joint section of a recording medium from which section new data were recorded (append-write) after already recorded data.

Rotary head type digital audio tape recorders (R-DAT) are available in markets as audio equipment of high sound quality. Studies have been made extensively for using R-DATs as external storage devices for computers. If an R-DAT is used as an external device, the storage capacity per one roll of a recording tape becomes as large as 1 giga (G) bytes.

If a conventional R-DAT itself is used as an external storage device, there arises a problem that the data recorded at a joint section during append-write cannot be correctly read (reproduction error). The reason for this is that track pitches before and after the joint section during append-write are not equal, namely, tape speeds are not equal.

Even if there are some musical signal data which could not be read correctly, the data can be modified through error correction or interpolation schemes to the extent that human acoustic sense does not recognize error modification. However, such error modification is not allowed for the case of computers and the like.

Append-write operation using a conventional R-DAT will be described below with reference to FIGS. 1 and 2. FIG. 1 shows a system arrangement of a conventional servo circuit in block, and FIG. 2 is a diagram used for explaining the operation of the servo circuit.

Referring to FIG. a rotary drum having magnetic heads (simply called heads hereinafter) $2a$ and $2b$, is controlled to rotate at a constant velocity by a dedicated servo circuit (not shown). A capstan motor 3 is controlled during a playback mode by a sum of signals from a velocity servo system and tracking system, and during a recording mode by a sum of signals from the velocity servo system and phase servo system.

For the capstan servo during the playback mode, a tracking signal (position detecting signal) recorded on a magnetic tape (hereinafter called a tape) 4 is read by the heads $2a$ and $2b$ and amplified by an amplifier 5. The tracking signal is then supplied to a tracking position detecting circuit 6 and transformed into a tracking error signal (position error signal) $S_a$. A waveform of the signal $S_a$ is shown in FIG. 2($d$) (tracking detecting system).

The tracking position detecting circuit 6 detects a relative position of the tape 4 and heads $2a$ and $2b$ in the running direction of the tape 4.

During the recording mode, the tracking signal is generated by a signal processing circuit 10 and recorded on the tape 4.

In the velocity servo system, an FG pulse signal $S_d$ obtained by a frequency generator (FG) which rotates together with a capstan motor shaft 7, is supplied to a velocity detecting circuit 9 which generates a velocity error signal.

The velocity error signal and tracking error signal $S_a$ via a switch 12 are added together by an adder 13. In accordance with the addition signal, a control amplifier 14 controls a drive voltage to be applied to the capstan motor 3 to thereby maintain the tape transporting speed constant. In this case, the velocity error signal controls the high velocity region, and the tracking error signal controls the low velocity region. In addition, the velocity error signal has the role of a coarse control, and the tracking error signal has the role of a fine control.

Next, the capstan servo during the recording mode will be described. A clock signal $S_e$ of high precision obtained from a clock generator 15 constructed of a crystal oscillator and a frequency divider, as well as the FG pulse $S_d$, is applied to a phase comparator 16 which generates a phase error signal $S_b$ (phase servo system). The signal $S_b$ is supplied via the switch 12 to the adder 13, and the velocity error signal is directly supplied to the adder 13, to thereby control a drive voltage for the capstan motor 3.

The switches and 12 and the signal processing circuit 10 are controlled by signal/switch control circuit 17. The switch 12 is maintained to be turned off by the control circuit 17 until a signal is detected from the tape.

Next, there will be described operation during the append-write (new data are recorded immediately after the area where data have been already recorded on the tape 4).

If the stop mode is to be changed to the recording mode, the recording mode is not directly enabled, but the playback mode is first executed as shown in FIG. 2 (at time $t_0$). Even after the tracking signal to be reproduced becomes stable, that is, after the tracking error signal $S_a$ becomes stable (after time $t_1$), the frequencies of the clock signal $S_e$ and FG pulse $S_d$ are not correctly coincident with each other because of errors caused by extension/contraction of the tape 4 or the like. Accordingly, even after the time $t_1$, the phase error signal $S_b$ may fluctuate as shown by the waveform in FIG. 2($e$).

If the control circuit 17 judges that the tracking error signal $S_a$ has been stabilized sufficiently, the operation switches to the recording mode (time $t_2$) so that the tracking signal and data signal supplied from the signal processing circuit star being recorded. At this time, the switches 11 and 12 are also turned to the recording mode side. At the transition period (at data junction section) from the playback mode to the recording mode, the following problems occur.

At the time $t_2$ when the recording mode starts, the heads $2a$ and $2b$ are tracing the correct position and the tape 4 is running at a correct speed. However, at the same time $t_2$, the phases of the clock signal $S_e$ and FG pulse $S_d$ are not equal in most cases. Accordingly, an output signal $S_c$ from the switch 12 (the output signal $S_c$ changes to the phase error signal $S_b$ after the time $t_2$) is disturbed greatly in the negative direction (or positive direction) as shown in FIG. 2($f$). The servo circuit responds to the disturbance and greatly changes the drive voltage to the capstan motor so as to quickly follow the capstan phase at that time. As a result, the tape speed is disturbed as shown in FIG. 2($g$). Signals recorded at the junction where the tape speed fluctuate cannot be read correctly during the playback mode. A conventional servo circuit therefore cannot realize seamless append-write (recording without a joint).

The tape speed becomes stable after time $t_3$ because the phase of the clock signal $S_e$ and FG pulse $S_d$ are made coincident by the servo circuit.

The above problem may be solved if the phase of the clock signal $S_e$ is made coincident with that of the FG pulse $S_d$ immediately before the switching from the playback mode to the recording mode. However, it is difficult for this method to be adopted to the conventional IC (integrated circuit) servo circuit in many cases. The reason for this is that a conventional servo IC is integrally built with the tracking position detecting circuit 6, velocity detecting circuit 9, switch 12, clock generator 15, phase comparator 16, and a part of the control circuit 17.

The operation of recording data on a new tape by the servo circuit will be described with reference to FIG. 3.

As shown in FIG. 3(c), the switch 12 is maintained turned off before the time $t_2$. While the switch 12 is maintained turned off, the output from the switch 12 is fixed at the center level of the output ranges from the tracking position detecting circuit 6 and phase comparator 16 (the level with no error of the tracking error signal $S_a$ and the level with phase difference 0 degree of the phase error signal $S_b$). Accordingly, the capstan motor 3 is servo-controlled by only the velocity servo system until the time $t_2$.

As described previously, the phase of the FG pulse $S_d$ is not generally coincident with that of the clock signal $S_e$ at the time $t_2$, and the level of the phase error signal $S_b$ is not coincident with the center level of the output range of the phase comparator 16. Accordingly, when the switch 12 is turned to the recording mode side at the time $t_2$ and the phase servo system is incorporated, this servo circuit operates to correct the phase quickly, thereby posing the problem of disturbance of the tape speed.

SUMMARY OF THE INVENTION

An object of the present invention is provide a servo circuit for a capstan motor capable of removing tape speed disturbances almost completely even if the phase of the clock signal and FG pulse are not coincident at the time of switching from the playback mode to the recording mode in an R-DAT, thereby easily allowing seamless append-write.

In order to achieve the above object, the servo circuit of the present invention comprises recording means for recording a position detecting signal on a recording medium transported by the capstan motor at a predetermined speed in a predetermined direction, a magnetic head for reproducing the position detecting signal recorded on the medium, a position detecting circuit for detecting a relative position error in the a medium transporting direction between the medium and the head and for outputting a position error signal, a pulse generator for generating a pulse signal having a frequency which is proportional to a transporting speed of the medium, a velocity detecting circuit for outputting a velocity error signal in accordance with a difference between the frequency of the pulse signal and a predetermined frequency, a phase comparator for comparing phases of a clock signal having a constant frequency and the pulse signal and for outputting a phase error signal, a switch for selectively outputting one of the position error signal and the phase error signal, and a velocity control means for controlling the capstan motor by a velocity control signal which is obtained by adding together the velocity error signal and the selected one of the position error signal and the phase error signal.

The servo circuit further comprises signal holding means connected in series to a signal supply path from the position detecting circuit to the velocity control means via the switch, comparator means receiving the phase error signal for outputting a detecting signal when the phase error signal is within a predetermined level range, and holding control means receiving the detecting signal from the comparator means for controlling the signal holding means in such a manner that in the case where the servo circuit is transited to a recording mode, until the transporting speed of the medium sufficiently reaches a predetermined speed, the signal holding means is caused to be in a passing state and then to enter a holding state, and when the comparator means outputs the detecting signal for a period equal to or longer than a predetermined time duration, the signal holding means is caused to return to the passing state.

As described above, according to the servo circuit of the present invention, it is possible to retain the transporting speed of the recording medium at a junction the same as that before and after the junction, for the case where new data are to be recorded after the area where the data are already written on the recording medium (append-write). Accordingly, a storage device using this servo circuit can correctly reproduce new data recorded at the junction continuously after reproducing the already written data before the junction.

DETAILED DESCRIPTION OF THE PREFERRED EMBODIMENTS

The preferred embodiments of the present invention will now be described in detail with reference to attached drawings.

Figure 1:
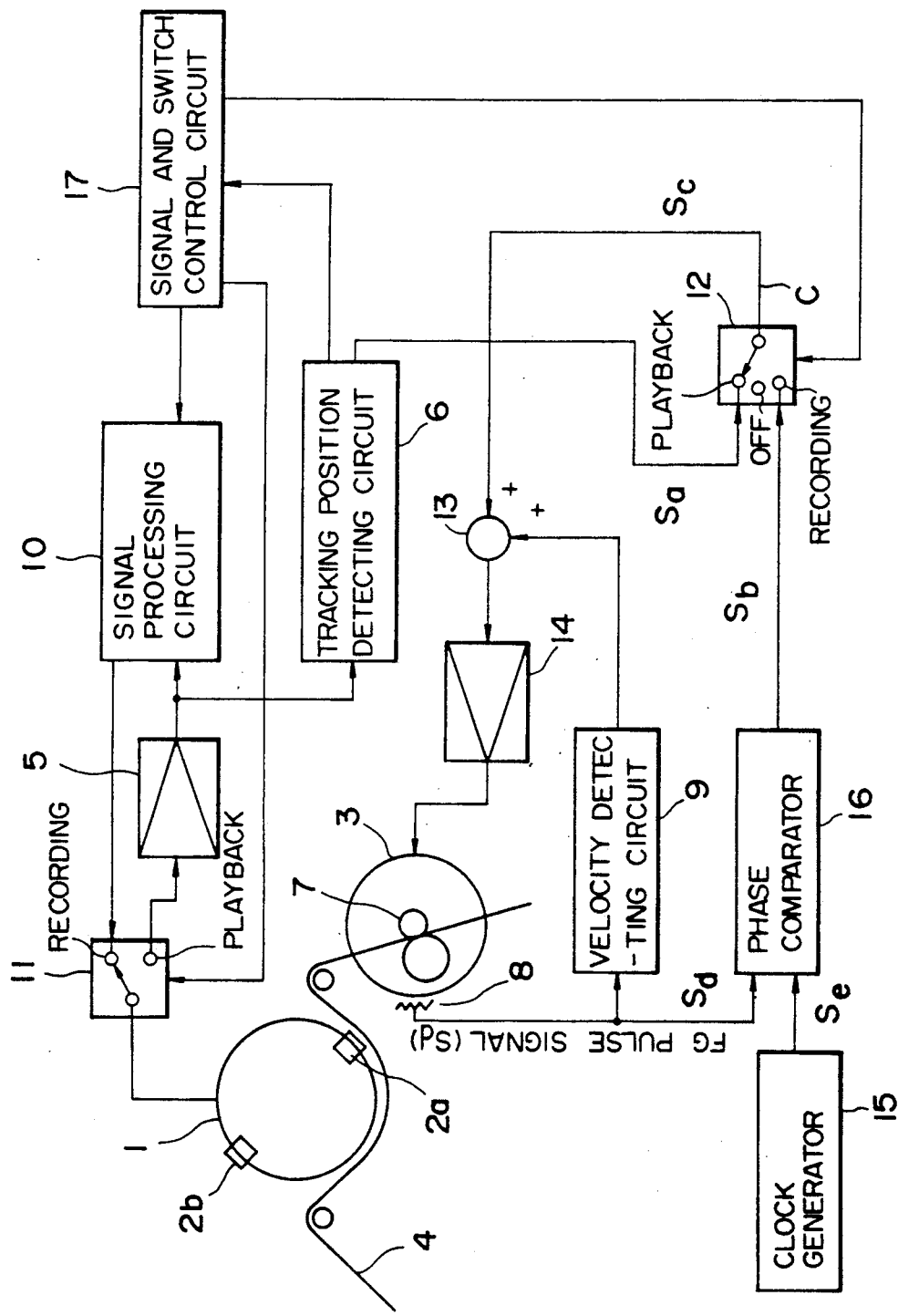
FIG. 1 is a block diagram showing a system arrangement of a conventional servo circuit for a capstan motor.
Figure 2:
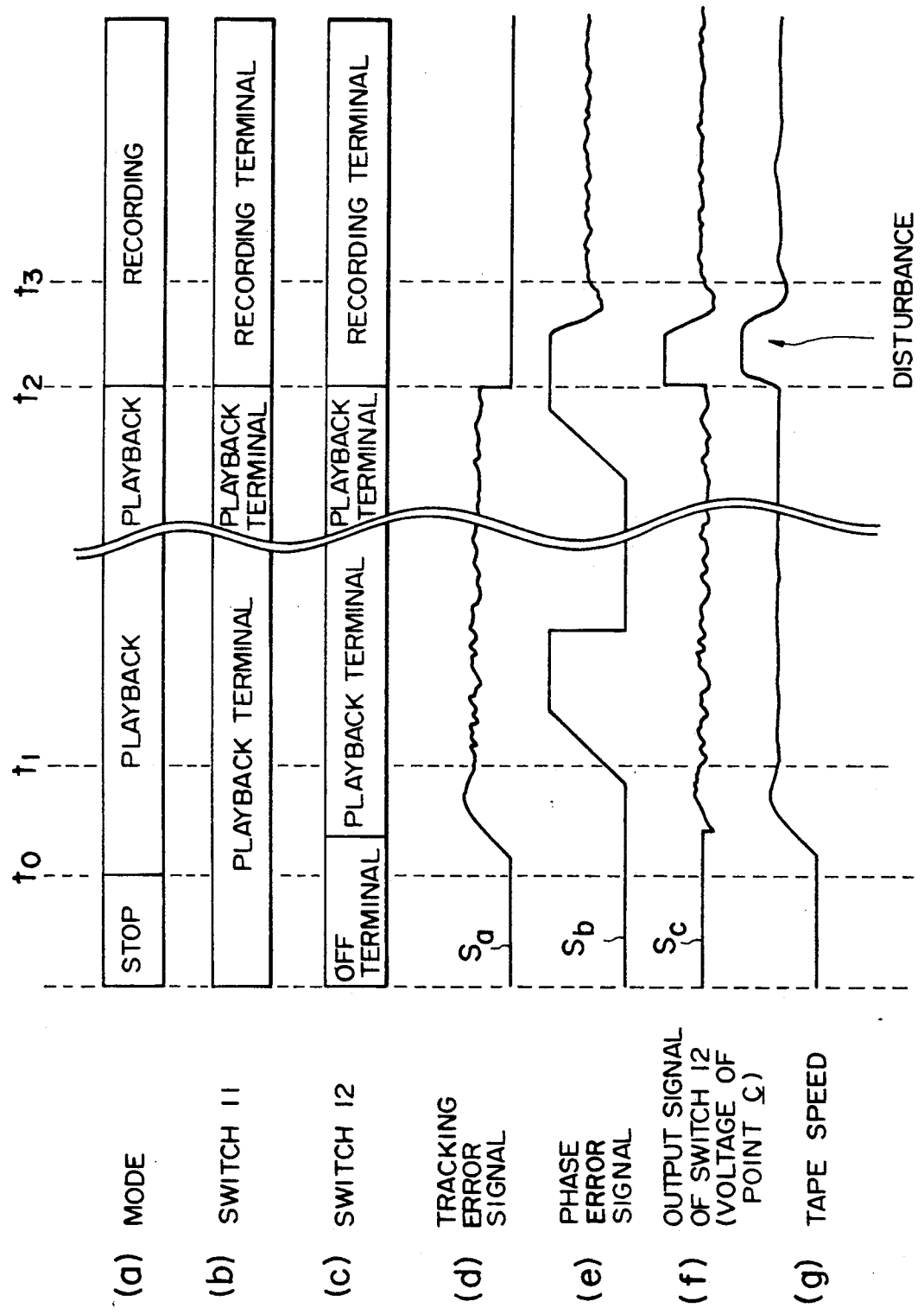
FIG. 2 is a timing chart for explaining an operation of the conventional circuit of FIG. 1 during the append-write.
Figure 3:
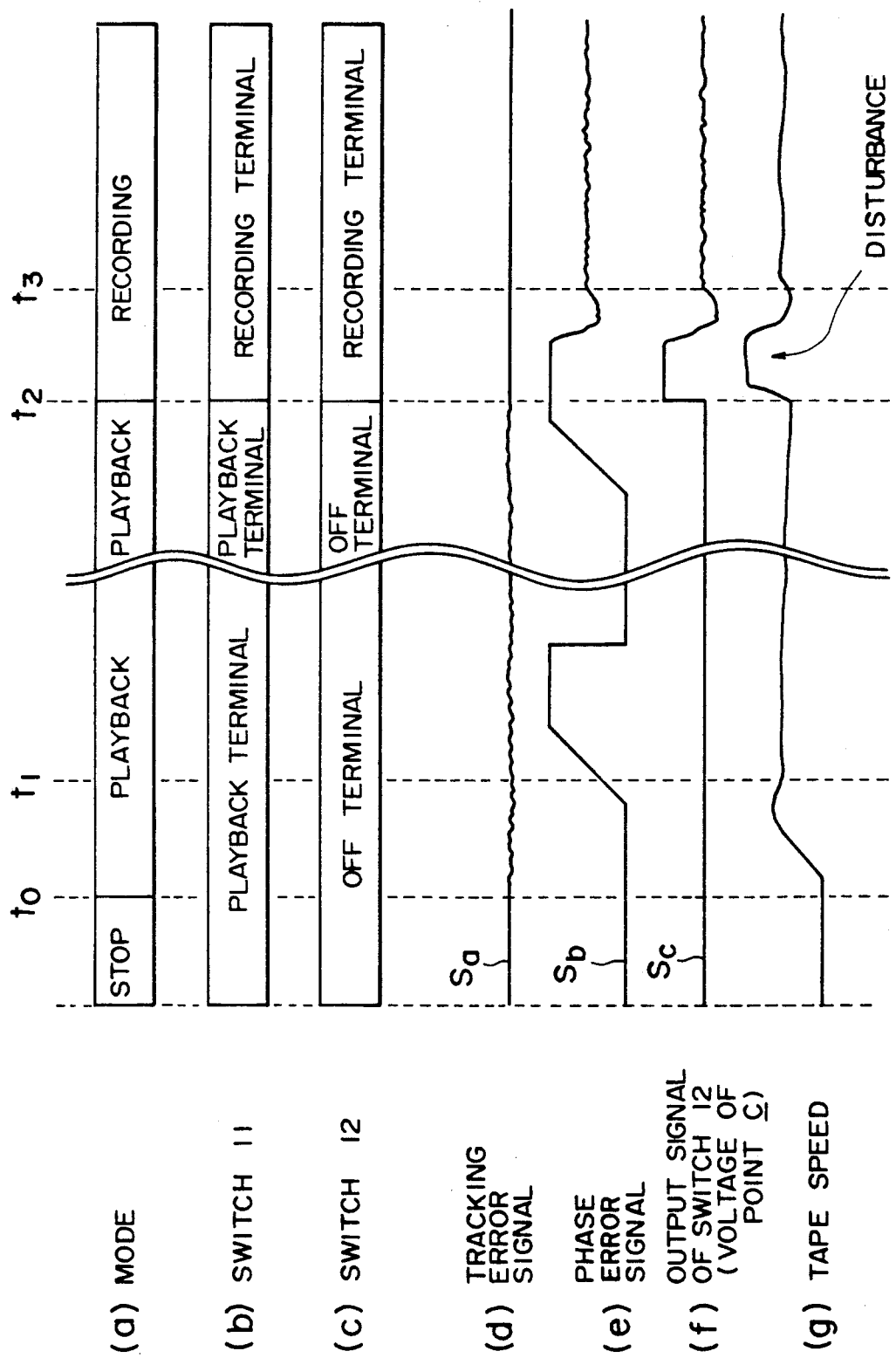
FIG. 3 is a timing chart used for explaining the operation of recording data on a new tape by the conventional servo circuit.
Figure 4:
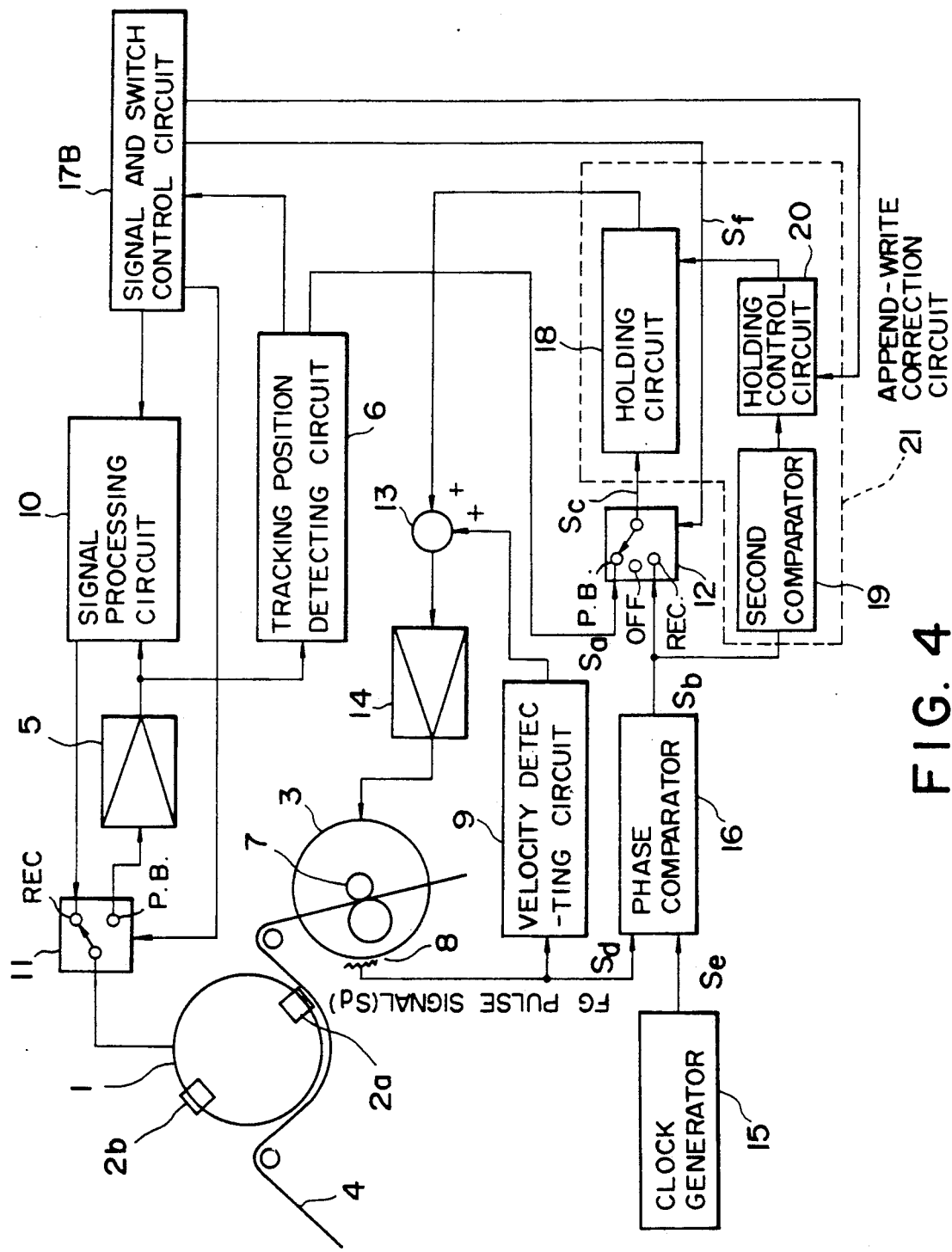
FIG. 4 is a block diagram showing a system arrangement of a servo circuit for a capstan motor according to a first embodiment of the present invention.
Figure 5:
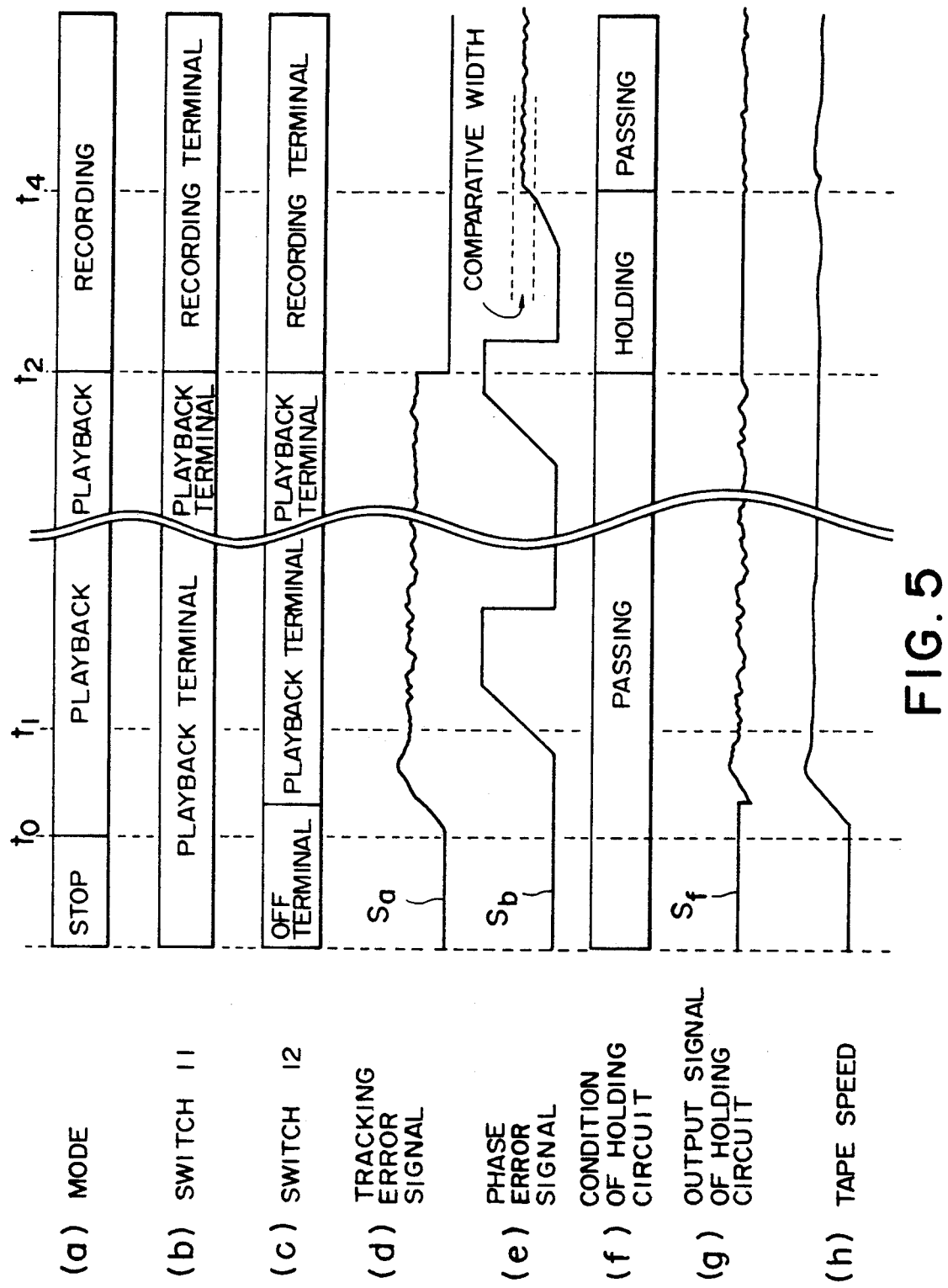
FIG. 5 is a timing chart for explaining the operation of the servo circuit according to the first embodiment during append-write.

The first embodiment will be described with reference to FIG. 4 showing the system arrangement in block form of the servo circuit, and FIG. 5 showing an operation thereof during append-write. Like elements to those shown in FIGS. 1 to 3 are represented by using identical reference numerals, and the duplicated description thereof is omitted.

The first embodiment uses a holding circuit 18, second comparator 19 and holding control circuit 20 added to the conventional servo circuit.

The holding circuit 18 is connected between the output side of the switch 12 and the input side of the adder 13. The second comparator 19 has its input side connected to the output side of the first phase comparator 16, and its output side connected to the input side of the holding control circuit 20. The control signal output terminal of the circuit 20 is connected to the hold circuit 18. The circuit diagram of the holding circuit 18 is given in FIG. 6.

Figure 6:
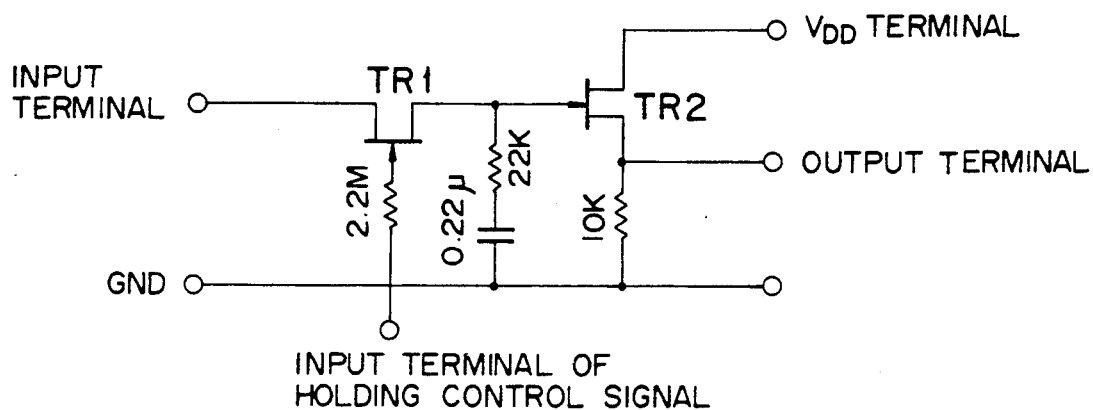
FIG. 6 is a circuit diagram showing a circuit arrangement of a holding circuit of the servo circuit according to the first embodiment.

As shown in FIG. 6, the holding circuit 18 comprises a first transistor TR1 of a metal oxide semiconductor (MOS) type and a second transistor TR2 of the MOS type. The TR1 has a drain supplied with a signal switched and output from the switch 12, and a gate supplied with the control signal from the holding control circuit 20. The second transistor TR2 has a gate supplied with the source output of the first transistor TR1, a drain supplied with a constant voltage, and a source outputting a signal holding control signal for holding the position error signal.

Next, the operation of the servo circuit during append-write will be described. During the period from the stop mode to the time $t_2$ immediately before the operation, the servo circuit is switched to the playback mode, and similar operation as conventional is carried out. Up to the time $t_2$ the holding circuit 18 is retained in a passing state by the control circuit 20 so that the output signal $S_c$ (up to the time $t_2$, the tracking error signal $S_a$) from the switch 12, as it is, is supplied to the adder 13.

When the control circuit 17B judges that the tracking error signal $S_a$ becomes sufficiently stable (at the time $t_2$), the control circuit 17B causes the circuit operation to switch to the recording mode. At this time, the switches 11 and 12 are turned from the playback mode to the recording mode. The control circuit 20 responds to the mode change signal from the control circuit 17B and causes the holding circuit 18 to switch from the passing state to a holding state (refer to FIG. 5(f)). This state switching of the holding circuit 18 is executed at the same time $t_2$ when the playback mode switches to the recording mode, or at the time immediately before the time $t_2$.

In the above manner, the level of an output signal $S_f$ outputted from and supplied to the adder 13 is the same as that of the tracking mode (refer to FIG. 5(g)), so that the drive voltage to the capstan motor 3 does not change from that during the playback mode (before $t_2$). As a result, at the time of switching to the recording mode, the tape speed is retained substantially at the same time speed as that during the playback mode (refer to FIG. 5(h)).

While the holding circuit 18 is in its holding state, the phase of the FG pulse $S_d$ and clock signal $S_e$ gradually become coincident with each other. The time required for such coincidence is generally 1 to 200 seconds.

The comparator 19 detects that phase of the FG pulse $S_d$ and clock signal $S_e$ become substantially coincident (that the level of the phase error signal $S_b$ from the phase comparator 16 enters within the comparative width of the comparator 19), and outputs a detection signal to the control circuit 20. When the control circuit detects that the detection signal continues for a period equal to or longer than a predetermined time duration, it causes the holding circuit 18 to enter the passing state (time $t_4$). When the holding circuit 18 enters the passing state, the phase error signal $S_b$ from the phase comparator 16 is supplied to the adder 13. The phases of the FG pulse $S_d$ and clock signal $S_e$ are coincident at this time (the time $t_4$), so that there occurs no disturbance of the tape speed.

In the above description, the switch 12 is turned from the playback mode side to the recording mode side at the time $t_2$. This switching time may be the time $t_4$. In any event, the holding circuit 18 enters its passing state after the time $t_4$ so that the switch 12 should be turned to the recording mode side.

In the above manner, the servo circuit according to the first embodiment allows a constant tape speed at the time of switching from the playback mode to the recording mode during the append-write. Accordingly, an external storage device using this servo circuit can correctly reproduce additionally recorded data at the junction, without any reproduction error, thus realizing seamless append-write.

Next, the description will be directed to the comparative width of the comparator 19 associated with the timing (the time $t_4$) when the holding circuit 18 switches from its holding state to its passing state, and the time duration while the detection signal continues which is detected by the control circuit 20.

Figure 7:
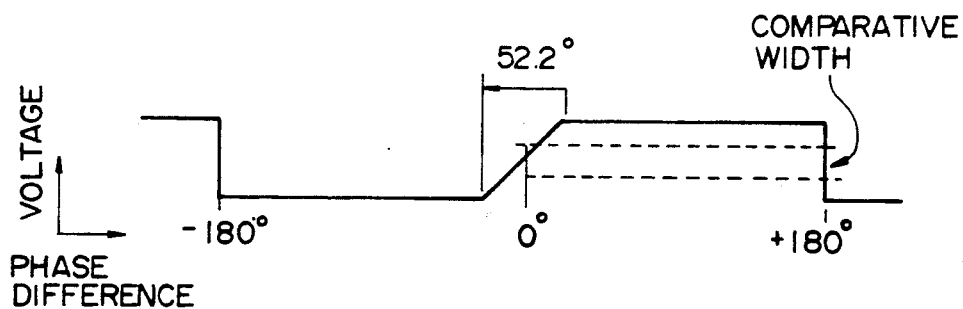
FIG. 7 is a timing chart showing a phase difference and voltage conversion of the phase comparator of the servo circuit according to the first embodiment.

The narrower the comparative width of the comparator 19 for the judgment of coincidence between the phases of the FG pulse $S_d$ and the clock signal $S_e$ is, the more correct the judgment becomes in general. However, too narrow a comparative width is susceptible to the influence of noise, resulting in possible failure in detecting the phase coincidence. In view of this, the comparative width is determined by taking into consideration of the characteristics (for the determination of the phase error signal) of phase difference versus voltage conversion of the phase comparator 16. The characteristics of phase difference and voltage conversion of the comparator 19 of this embodiment are sharp as shown in FIG. 7 so that the relatively wide comparative width is sufficient. In this embodiment, the comparative width is determined as one third of the peak-to-peak voltage.

In order to detect phase coincidence, it is necessary for the control circuit 20 to detect that the phase coincidence signal from the comparator 19 continues for a period equal to or longer than a predetermined time duration (that the level of the phase error signal remains within the comparative width for that period). This is because an erroneous detection of a phase coincidence should be avoided at the difference 180 degrees shown in FIG. 7.

In this embodiment, the time required for the phase error signal $S_b$ outputted from the phase comparator 16 passes through the comparator width is about 1.5 msec at the 180-degree side. On the other hand, the time required for passing at the 0 degree side becomes shorter as the frequency difference between the FG pulse $S_d$ and the clock signal $S_e$ becomes large. The embodiment servo circuit has a 10% variable width of the capstan speed, so that the passing time at 0-degree side becomes 45 msec at minimum. On the other hand, even if a true coincidence is missed to be detected, the detection of the next coincidence will be performed.

From the above standpoint, the detection time duration of the detection signal detected by the comparator 19 is set about 15 msec while giving a large margin on the 180-degree side. Specifically, if the level of the phase difference signal $S_b$ remains within the comparator width for a period equal to or longer than 15 msec, the control circuit 20 judges that the phases become substantially coincident and causes the holding circuit to switch to its passing state. The reason for setting the detection time duration at about 15 msec is as follows. If the 180-degree point is erroneously detected as phase coincidence, the tape speed is greatly disturbed.

In the above embodiment, a conventional servo IC has been used which builds therein the switch 12, tracking phase detecting circuit, velocity detecting circuit 9, clock generator 15, phase comparator 16 and the like. The operation of the comparator 19 and control circuit 20 is actually executed by a microcomputer with an A/D input prefabricated with R-DAT. Accordingly, the embodiment servo circuit can be realized by adding only the holding circuit to this conventional servo IC.

As can be appreciated, the first embodiment can use a conventional IC servo circuit as it is and the number of additional components is very small, thereby realizing a servo circuit of low cost.

Figure 8:
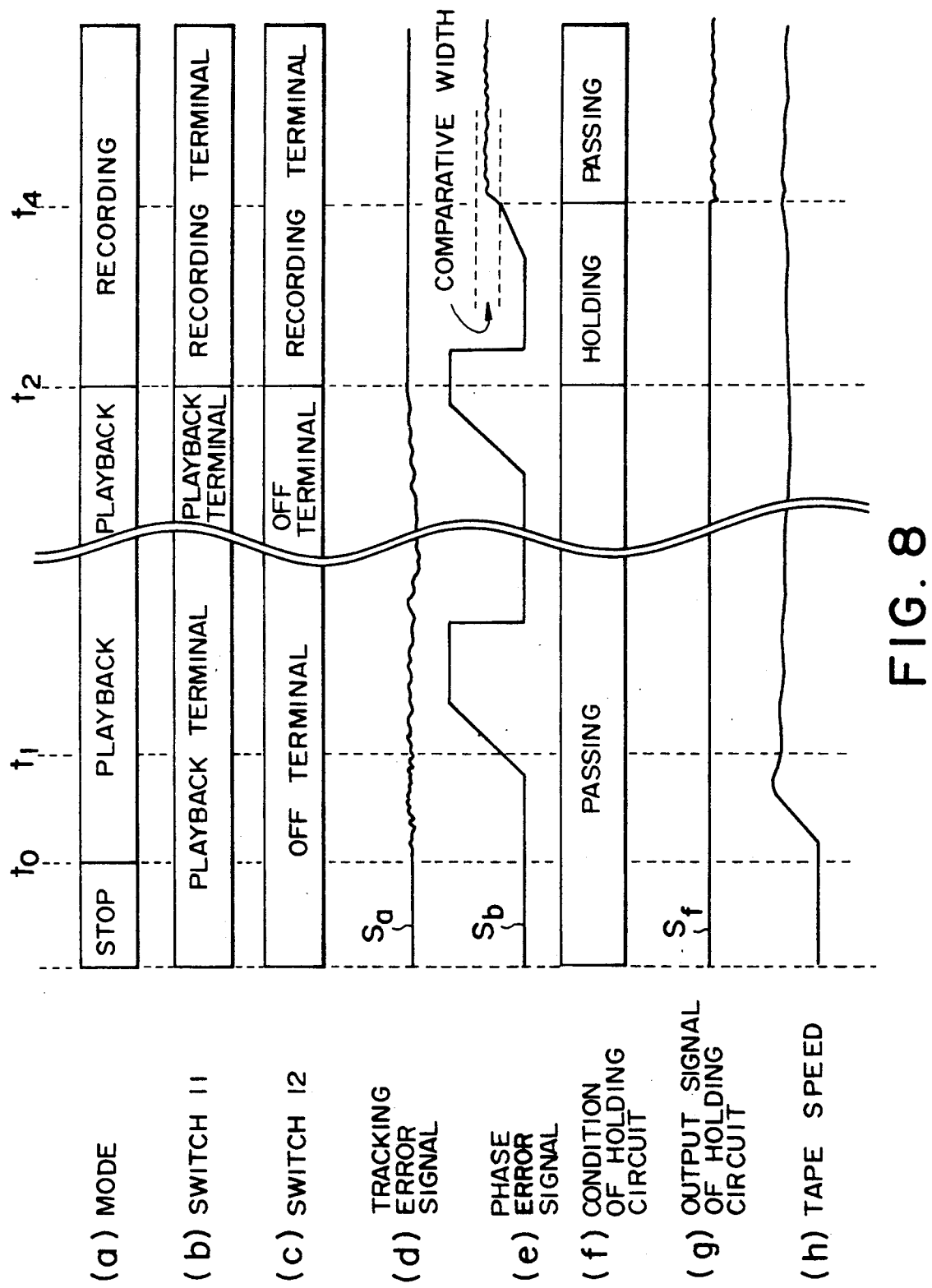
FIG. 8 is a timing chart for explaining an operation of recording data on a new tape by the servo circuit according to the first embodiment.

Next, the operation of recording data on a new tape instead of the append-write will be described with reference to FIG. 8. The difference from append-write is that the switch 12 is maintained turned off up to the time $t_2$. Up to this time $t_2$, the servo circuit operates only by a velocity servo system similar to the conventional one. In this case, disturbance of the tape speed can be also prevented by the holding circuit 18 at the switching of the switch 12 at the time $t_2$.

Figure 9:
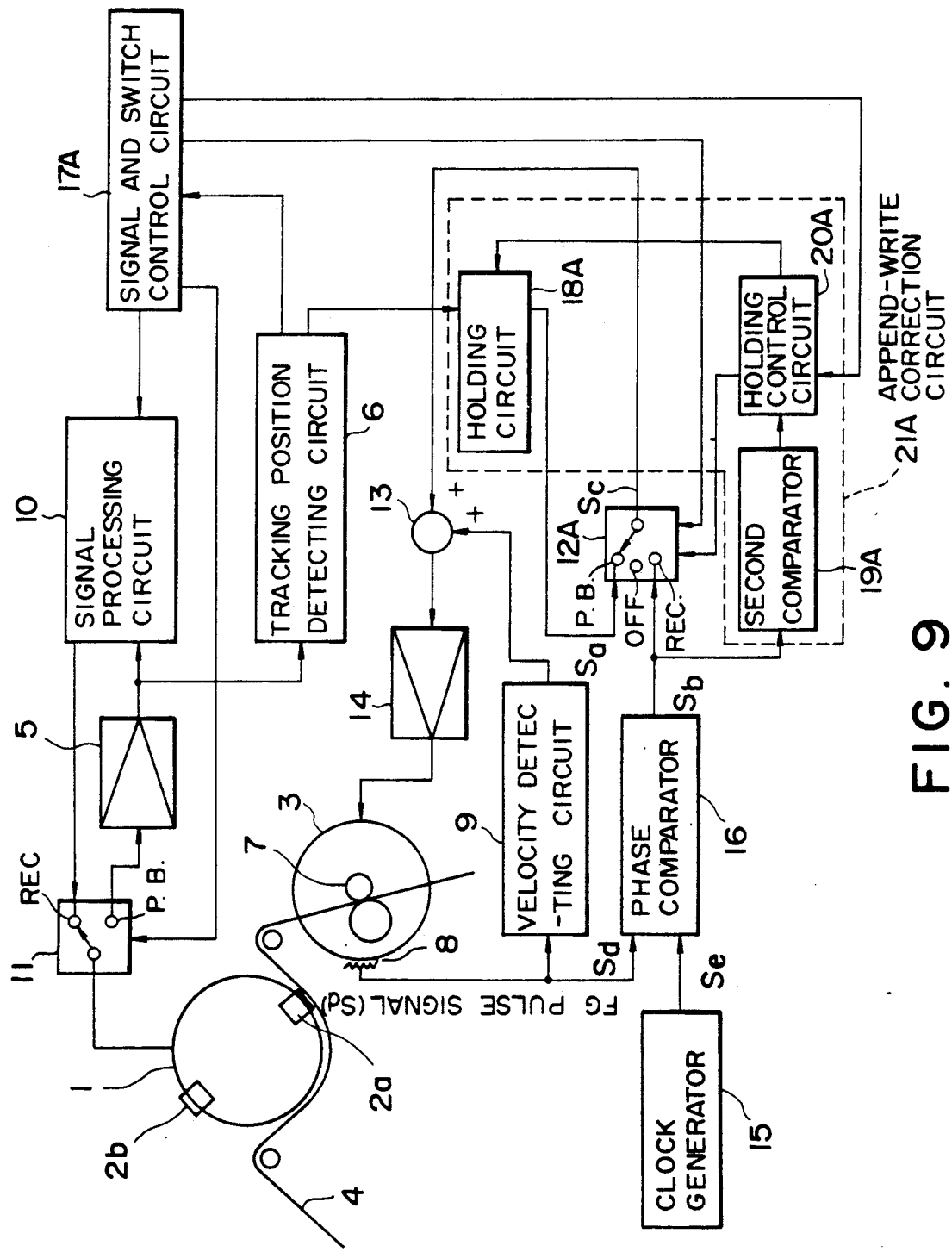
FIG. 9 is a block diagram showing an arrangement of the servo circuit according to a second embodiment of the present invention.

The system arrangement of the second embodiment of the present invention is shown in FIG. 9 is a block form. In the second embodiment, the holding circuit 18A is connected between the tracking position detecting circuit 6 and the playback mode side of the switch 12. The circuits 18A to 20A constitute an append-write correction circuit 21A.

The operation of the second embodiment during the append-write is substantially the same as the first embodiment except that the switch 12A is remained turned to the playback mode up to the time $t_4$ and turning the switch 12A to the recording mode side at the time $t_4$ is controlled by the control circuit 20A which also causes the holding circuit 18A to enter the passing state.

The servo circuit according to the second embodiment also can execute seamless append-write.

What is claimed is:

1. A servo circuit for a capstan motor including recording means for recording a position detecting signal on a recording medium transported by the capstan motor at a predetermined speed in a direction, a magnetic head for reproducing said position detecting signal recorded on said medium, a position detecting circuit for detecting a relative position error in the medium transporting direction between said medium and said head for outputting a position error signal, a pulse generator for generating a pulse signal having a frequency which is proportional to a transporting speed of the medium, a velocity detecting circuit for outputting a velocity error signal in accordance with a difference between the frequency of the pulse signal and a predetermined frequency, a phase comparator for comparing phases of a clock signal having a constant frequency and the pulse signal and for outputting a phase error signal, a switch for selectively outputting one of the position error signal and the phase error signal, and velocity control means for controlling the capstan motor by a velocity control signal which is obtained by adding together said velocity error signal and the selected one of the position error signal and the phase error signal, said servo circuit further comprising:

signal holding means connected in series to a signal supply path from said position detecting circuit to said velocity control means via said switch;

comparator means receiving said phase error signal for outputting a detection signal when said phase error signal is within a predetermined level range; and holding control means receiving said detecting signal from said comparator means for controlling said signal holding means in such a manner that in the case where the servo circuit is transited to a recording mode, until the transporting speed of the medium sufficiently reaches a predetermined speed, the signal holding means is caused to be in a passing state and then to enter a holding state, and when said comparator means outputs said detection signal for a period equal to or longer than a predetermined time duration, the signal holding means is caused to return to the passing state.

2. A servo circuit according to claim wherein said signal holding means, comparator means and holding control means constitute an append-write correction circuit for removing disturbances of the transporting speed of the medium at the time when said switch is switched between playback mode, recording mode and operation-off mode.

3. A servo circuit according to claim wherein said signal holding means comprises:

a first transistor of a metal oxide semiconductor (MOS) type having its drain supplied with a signal switched and outputted from said switch, and its gate supplied with a control signal from said holding control means; and a second transistor of a MOS type having its gate supplied with the source output of said first transistor, its drain supplied with a constant voltage, and its source outputting a signal holding control signal for holding said position error signal.

* * * * *